(12) United States Patent
Cajiga et al.

(10) Patent No.: US 11,415,271 B2
(45) Date of Patent: Aug. 16, 2022

(54) SYSTEM AND METHOD FOR STORING LIQUID AND GASEOUS FUELS

(71) Applicant: CAPAT LLC, Miami, FL (US)

(72) Inventors: Jose A. Cajiga, Miami, FL (US);
Arturo Cajiga, Miami, FL (US);
Vicente Cajiga, Miami, FL (US);
Alexandra Cajiga, Miami, FL (US)

(73) Assignee: CAPAT LLC, Miami, FL (US)

( * ) Notice: Subject to any disclaimer, the term of this patent is extended or adjusted under 35 U.S.C. 154(b) by 0 days.

(21) Appl. No.: 15/929,851

(22) Filed: May 26, 2020

(65) Prior Publication Data

US 2020/0284397 A1 Sep. 10, 2020

Related U.S. Application Data

(62) Division of application No. 15/730,117, filed on Oct. 11, 2017, now Pat. No. 10,774,993.

(Continued)

(51) Int. Cl.
*F17C 13/08* (2006.01)
*B67D 7/00* (2010.01)
(Continued)

(52) U.S. Cl.
CPC .............. *F17C 13/081* (2013.01); *B67D 7/00* (2013.01); *F17C 13/004* (2013.01); *F17C 13/126* (2013.01); *F17C 2201/0147* (2013.01); *F17C 2203/03* (2013.01); *F17C 2203/0304* (2013.01); *F17C 2203/0626* (2013.01); *F17C 2203/0631* (2013.01); *F17C 2205/018* (2013.01);

(Continued)

(58) Field of Classification Search
CPC .... F17C 13/081; F17C 13/004; F17C 13/126; F17C 2203/03; F17C 2203/0626; F17C 2205/0184; F17C 2270/0139
USPC ......................................................... 141/231
See application file for complete search history.

(56) References Cited

U.S. PATENT DOCUMENTS 2,021,544 A ‡ 11/1935 Crown ..................... B67D 7/38
222/13
3,115,983 A ‡ 12/1963 Wissmiller ............. B65D 90/12
220/560.1

(Continued)

OTHER PUBLICATIONS

Russian Notification and Search Report dated Dec. 10, 2019.‡

(Continued)

*Primary Examiner* — Timothy L Maust
(74) *Attorney, Agent, or Firm* — Grogan, Tuccillo & Vanderleeden, LLP

(57) ABSTRACT

A system for storing fuel includes a support structure supporting at least one fuel tank a predetermined distance above ground. The fuel tank includes an inner tank configured to contain a gaseous fuel, an intermediate tank encompassing the inner tank and defining a first annular space therebetween, and an outer tank encompassing the intermediate tank an defining a second annular space therebetween. The first annular space is filled with a shock-absorbing resin for absorbing structural stresses, while the second annular space is filled with an insulating material providing for fire and ballistic resistance. The intermediate tank is connected to the support structure and to at least one adjacent fuel tank, and prevents the transfer of load to the inner tank.

4 Claims, 5 Drawing Sheets

Related U.S. Application Data

(60) Provisional application No. 62/406,606, filed on Oct. 11, 2016.

(51) Int. Cl.
  *F17C 13/00* (2006.01)
  *F17C 13/12* (2006.01)

(52) U.S. Cl.
  CPC ..... *F17C 2205/0184* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/035* (2013.01); *F17C 2260/042* (2013.01); *F17C 2270/0139* (2013.01)

(56) References Cited

U.S. PATENT DOCUMENTS

| | | | | |
|---|---|---|---|---|
| 3,160,171 A ‡ | 12/1964 | Klein | ........................ | B60P 3/22 137/899.3 |
| H297 H ‡ | 7/1987 | Schultz | ..................... | B60S 5/02 137/234.6 |
| 4,901,748 A ‡ | 2/1990 | Shotmeyer | ................ | B60S 5/02 137/23 |
| 4,986,446 A ‡ | 1/1991 | Montgomery | ............ | B60S 5/02 137/23 |
| 4,991,613 A ‡ | 2/1991 | Kaminski | .............. | B65D 90/24 137/1 |
| 5,038,456 A ‡ | 8/1991 | McGarvey | ........... | B65D 90/501 220/560.01 |
| 5,564,588 A * | 10/1996 | Reese | ........................ | B60S 5/02 220/565 |
| 5,816,435 A ‡ | 10/1998 | Palazzo | ................ | B65D 90/505 220/58 |
| 6,698,610 B2 ‡ | 3/2004 | Berg | .................... | B65D 90/501 220/62 |
| 8,176,931 B1 ‡ | 5/2012 | Cajiga | ........................ | B60S 5/02 137/234.6 |
| 8,573,242 B2 ‡ | 11/2013 | Cajiga | ........................ | B60S 5/02 137/15.01 |
| 8,667,690 B2 ‡ | 3/2014 | Cajiga | ........................ | B60S 5/02 29/897.3 |
| 9,181,078 B2 ‡ | 11/2015 | Cajiga | ........................ | B60S 5/02 |
| 9,403,511 B2 * | 8/2016 | Cajiga | ........................ | B67D 7/04 |
| 2009/0314382 A1 ‡ | 12/2009 | Capizzo | .................... | G07F 7/06 141/2 |
| 2011/0131740 A1 ‡ | 6/2011 | Wong | ........................ | E01D 2/04 14/78 |
| 2015/0336680 A1 ‡ | 11/2015 | Schumacher | .......... | B64D 37/30 244/13 |

OTHER PUBLICATIONS

International Search Report and Written Opinion dated Jan. 4, 2018.‡

Extended EP Search Report issued in corresponding EP Patent Application No. 17861001.0 dated May 12, 2020.‡

First Examination Report dated Aug. 26, 2020 from corresponding Indian Patent Application Serial No. 201927015455.

\* cited by examiner
‡ imported from a related application

SYSTEM AND METHOD FOR STORING LIQUID AND GASEOUS FUELS

CROSS-REFERENCE TO RELATED APPLICATIONS

This application is a divisional of U.S. patent application Ser. No. 15/730,117 filed on Oct. 11, 2017, which claims the benefit of U.S. Provisional Application Ser. No. 62/406,606, filed on Oct. 11, 2016, which are incorporated by reference herein in their entireties.

FIELD OF THE INVENTION

The present invention relates generally to a fuel storage and distribution and, more particularly, to a system and method for storing liquid and gaseous fuels in an elevated and modular arrangement.

BACKGROUND OF THE INVENTION

Fuel storage and distribution stations are heavily demanded globally, as more and more automobiles are put into service on roads to meet the transportation demands of an ever-expanding population. The construction and operation of conventional fuel distribution and service stations, however, are lengthy, costly and resource-consuming undertakings. Surveys and studies of anticipated demand must be commissioned, the station must be designed in a configuration sufficient to meet the anticipated demand, permits must be pulled, and a lengthy construction process must be commenced and completed before a single gallon of gasoline may be pumped.

Notwithstanding resource-consuming undertakings for their construction and operation, conventional fuel distribution stations have numerous drawbacks with respect to environmental, safety, and maintenance concerns. First, fuel distribution stations are classified as objects of a potentially high environmental impact. For example, automotive fuels are typically stored in underground tanks from which the fuel is pumped to a fuel dispenser before going into an automobile. These tanks are typically constructed of metal or fiberglass. Underground installation of these tanks requires relatively extensive excavation and coverage, thereby creating many potential problems. One known problem associated with underground fuel tanks is leakage or seepage into the surrounding soil. This is particularly true of metallic tanks, which can corrode or degrade over time, especially in moist soil. Seepage into the surrounding soil results both in the steady loss of fuel and environmental (soil and water) pollution. Moreover, in case of flooding, the tanks installed underground are inefficient and the fuel in them may be contaminated with water and with sediments within the water.

Moreover, fuel tanks are buried underground beneath the structure of the station with a thick concrete disposal block on top of the tank, making it hard to perform maintenance work on the fuel tanks. Once a fuel tank is found to be dysfunctional, the cost of repairing and replacing the faulty underground fuel tank can be extremely expensive.

Another drawback associated with the conventional fuel storage and distribution stations is the inability to change the configuration of the station in terms of either capacity or type of fuel offered. Today, the use and demand of alternative energy fuels for transportation is increasing at a rapid pace, and the types of fuel demanded and the consumption rates thereof can be expected to increase drastically from what has been seen to date. Accordingly, new generations of fuel distribution stations must be flexible in terms of their size and the types of fuel that they can store and dispense in response to dynamically changing markets.

In view of the above, there is a need for a fuel storage and distribution station that is capable of safely storing a variety of fuel types, with a minimal environmental impact, and which can easily be modified or reconfigured to meet changing fuel demands.

SUMMARY OF THE INVENTION

With the foregoing concerns and needs in mind, it is the general object of the present invention to provide a system for storing and/or distributing liquid and gaseous fuels.

It is another object of the present invention to provide a system for storing fuel in an elevated position above ground.

It is another object of the present invention to provide a system for storing fuel that is modular in nature so that changes in fuel demand and type can be easily accommodated.

These and other objects of the present invention, and their preferred embodiments, shall become clear by consideration of the specification, claims and drawings taken as a whole.

In an embodiment, a system for storing fuel includes a support structure supporting at least one fuel tank a predetermined distance above ground. The fuel tank includes an inner tank configured to contain a gaseous fuel, an intermediate tank encompassing the inner tank and defining a first annular space therebetween, and an outer tank encompassing the intermediate tank an defining a second annular space therebetween. The first annular space is filled with a shock-absorbing resin for absorbing structural stresses, while the second annular space is filled with an insulating material providing for fire and ballistic resistance. The intermediate tank is connected to the support structure and to at least one adjacent fuel tank, and prevents the transfer of load to the inner tank. The fuel tanks, themselves serve as the structural support members for the system, obviating the need to employ stand-alone load bearing beams and members.

BRIEF DESCRIPTION OF DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
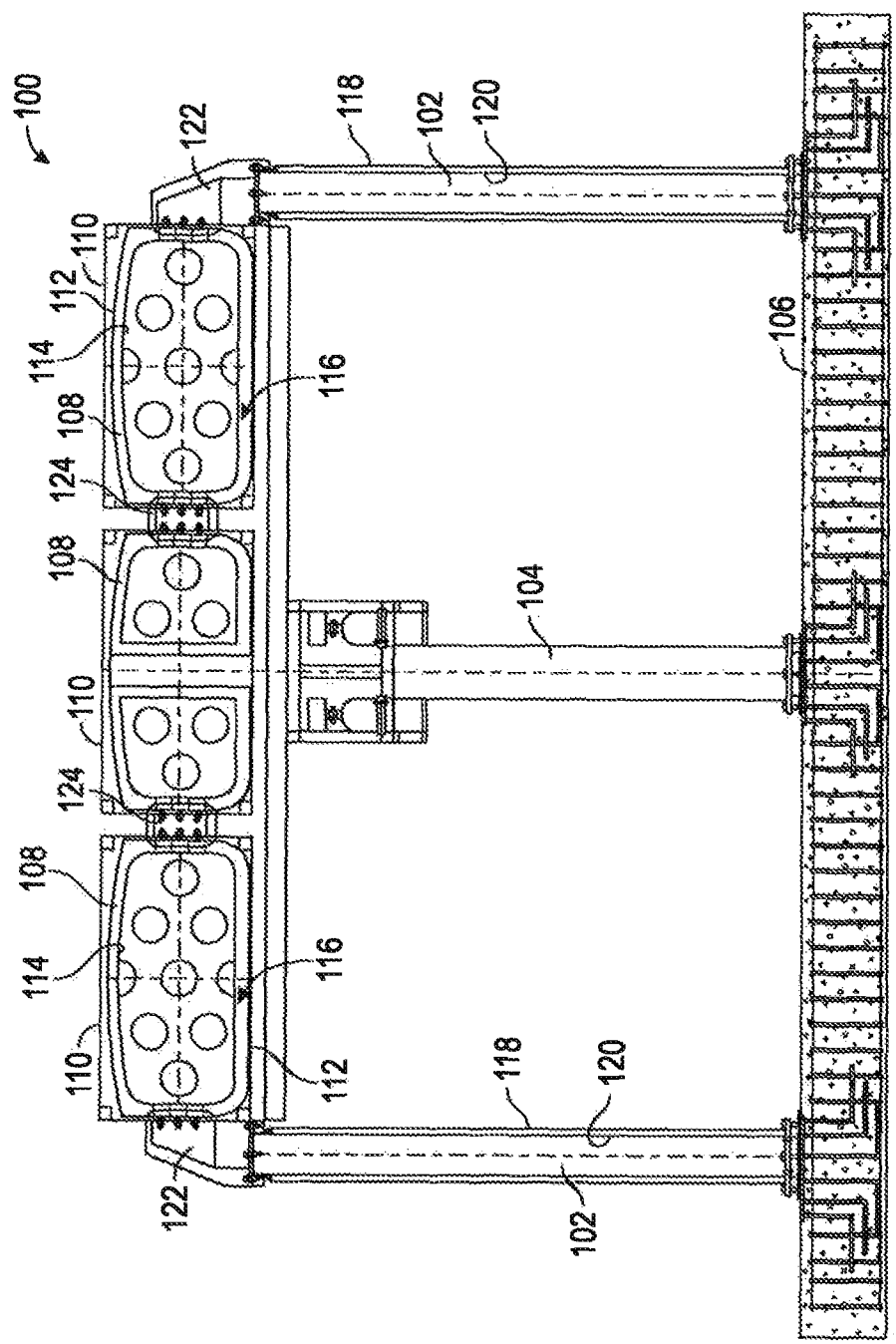
FIG. 1 is a cross-sectional, elevational view of a fuel storage and distribution system according to an embodiment of the invention, illustrating the storage of liquid fuel.

Referring to FIG. 1, a fuel storage system in the form of a modular fuel storage station 100 according to one embodiment of the present invention is shown. The fuel storage system 100 includes a plurality of support legs 102, 104 anchored or otherwise in contact with the ground 106. In an embodiment, the support legs 102 may be long support legs arranged on opposing sides of the system 100, while support leg 104 may be a shorter leg arranged intermediate the long support legs 102. As further illustrated in FIG. 1, the system 100 includes a plurality of fuel storage tanks 108 supported in an elevated position above the ground 106 by the legs 102, 104. In an embodiment, each tank 108 may be contained within a housing 110 configured to give the system 100 a pleasing appearance and on which advertising or other graphics may be displayed.

FIG. 1 shows tanks 108 that are configured to contain liquid fuel such as gasoline and the like. In an embodiment, each tank 108 may store the same type of fuel, although it is envisioned that different type of fuel may be stored in each tank, without departing from the broader aspects of the invention. For example, the tanks 108 may store various types of hydrocarbon fuel, including but not limited to gasoline, diesel, CNG (compressed natural gas), LPG (liquefied petroleum gas), hydrogen and methanol.

In an embodiment, the entire system 100 and components thereof, including the fuel tanks 108 and legs 102, 104, are of at least a double-wall construction for fire protection and impact resistance. For example, each tank 108 includes an outer wall 112 and an inner wall 114. In an embodiment, the space between the outer wall 112 and the inner wall 114 of each tank may be filled with a fire and ballistic resistant material 116, as discussed in detail hereinafter. Likewise, each of the legs 102, 104 may be of a double-wall construction, having an outer wall 118 and an inner wall 120.

Importantly, the legs and fuel storage tanks, via their double wall construction, have a fire resistance rating of at least 2½ hours, are ballistic proof, and meet the U.S. Department of State's vehicle impact requirements for K12 rating (i.e., less than 36 inch impact penetration for a 15,000 lb. vehicle traveling 50 mph). This construction provides an integral, strong structure with a high structural stress capacity.

Figure 2:
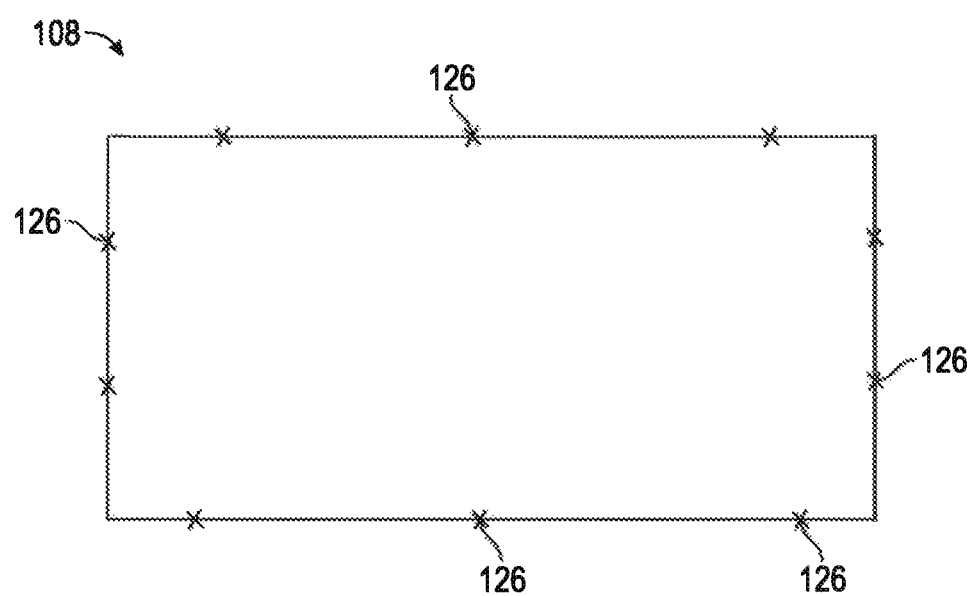
FIG. 2 is a schematic illustration of a fuel tank of the fuel storage system of FIG. 1, showing the location of various interconnection points for structural support.

As further shown in FIG. 1, the outer, long support legs 102 are attached directly to the outer tanks 108 via structural mounting brackets 122 or similar mechanisms, while the tanks 108 themselves are directly interconnected to one another by structural members or mounting brackets 124. As shown in FIG. 2, each tank 108 includes a plurality of joining points or connection points 126 for connecting directly with other tanks 108 or with the legs 102, via a mounting bracket or similar direct connections. By utilizing multiple, direct interconnection points between the tanks 108 themselves and the support legs 102, structural rigidity and load support may be increased. In addition, this direct interconnection at multiple points allows the tanks 108 themselves to function as load-bearing, structural members, obviating the need to employ extensive supporting beams or the like.

Figure 3:
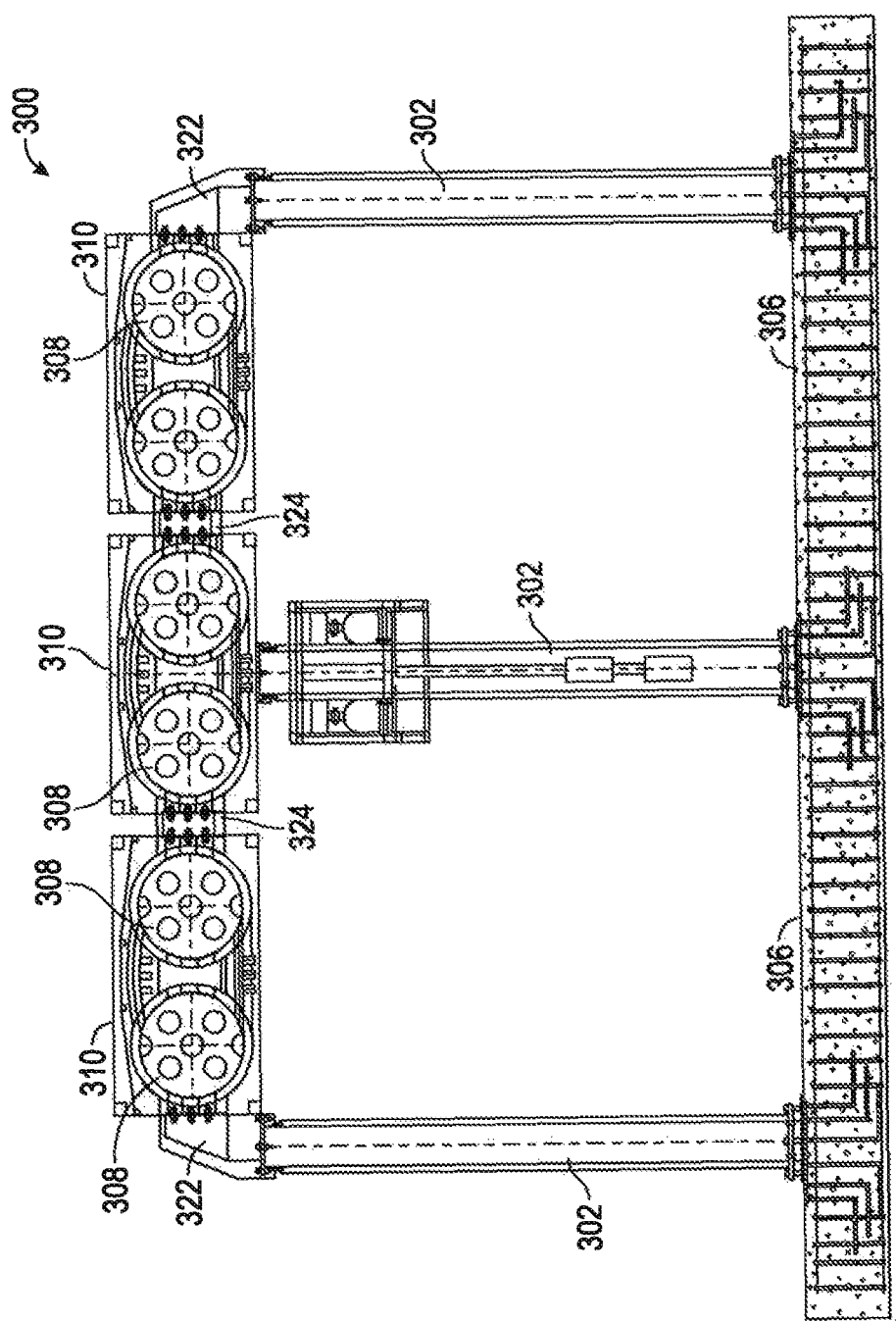
FIG. 3 is a cross-sectional, elevational view of a fuel storage and distribution system according to another embodiment of the invention, illustrating the storage of gaseous fuel.

Turning now to FIG. 3, an elevated, modular fuel storage system 300 according to another embodiment of the invention is shown. The system 300 is generally similar to system 100, where like reference numerals designate like parts. The system 300 includes a plurality of support legs 302 anchored or otherwise in contact with the ground 306, and supporting a plurality of fuel storage tanks 308 in an elevated position above the ground 306. In an embodiment, each tank 308 may be contained within a housing 310. The tanks 308 illustrated in FIG. 3 are specifically designed to store LPG (liquefied petroleum gas).

In an embodiment, the entire system 300 and components thereof, including the fuel tanks 308 and legs 102, like system 100 are of a double-wall construction for fire protection and impact resistance. Moreover, like the system 100 of FIG. 1, support legs 302 are attached directly to the outer tanks 308 via structural mounting brackets 322 or similar mechanisms, while the tanks 308 themselves are directly interconnected to one another by structural members or mounting brackets 324 at a plurality of interconnection points. Again, by utilizing multiple, direct interconnection points between the tanks 308 themselves and the support legs 302, structural rigidity and load support may be increased. In addition, this direct interconnection at multiple points allows the tanks 308 themselves to function as load-bearing, structural members, obviating the need to employ extensive supporting beams or the like.

Figure 4:
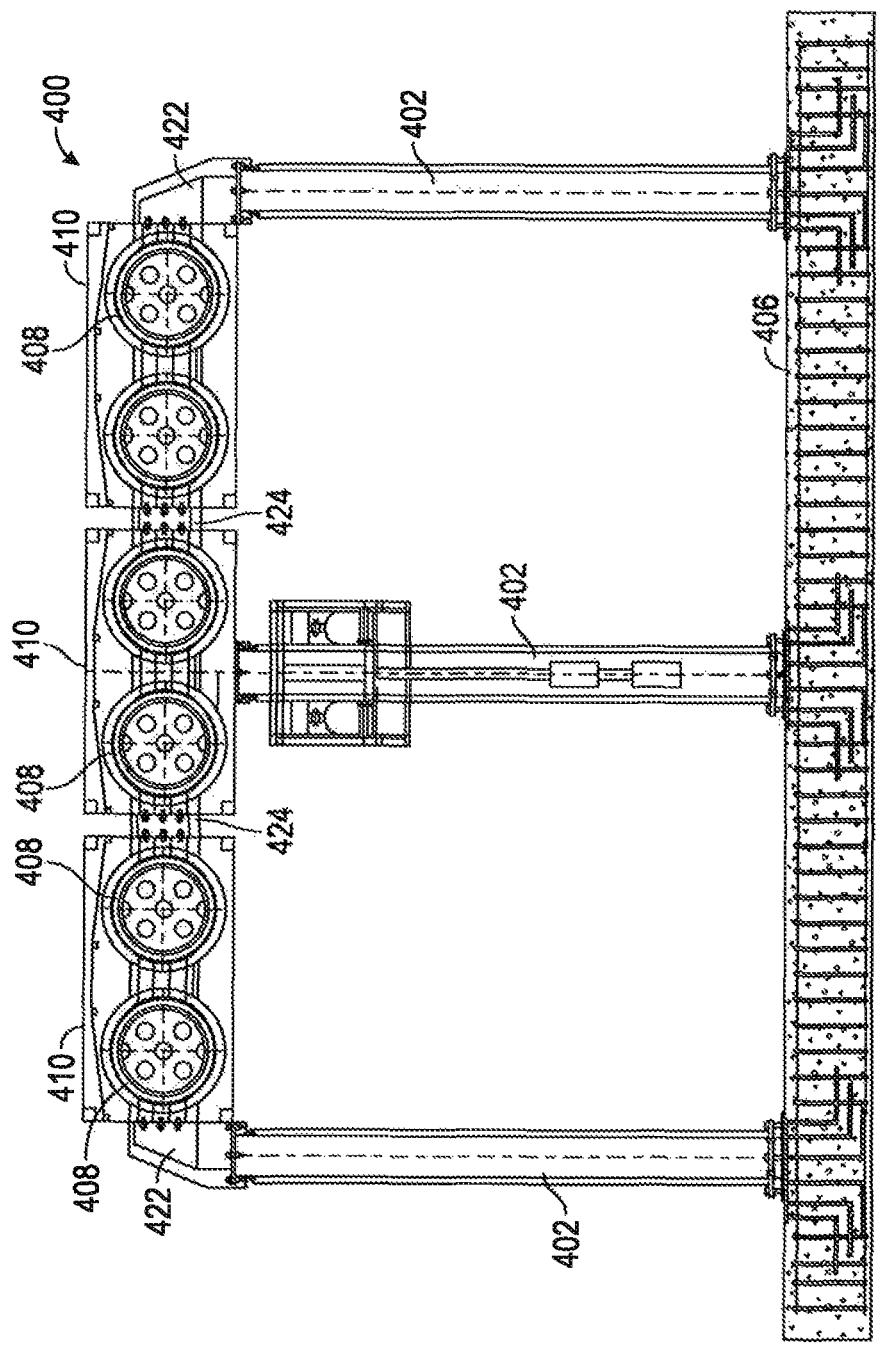
FIG. 4 is a cross-sectional, elevational view of a fuel storage and distribution system according to another embodiment of the invention, illustrating the storage of gaseous fuel.

Turning now to FIG. 4, an elevated, modular fuel storage system 400 according to another embodiment of the invention is shown. The system 400 is generally similar to systems 100 and 300. The system 400 includes a plurality of support legs 402 anchored or otherwise in contact with the ground 406, and supporting a plurality of fuel storage tanks 408 in an elevated position above the ground 406. In an embodiment, each tank 408 may be contained within a housing 410. The tanks 408 illustrated in FIG. 4 are specifically designed to store CNG (compressed natural gas).

As discussed above, the entire system 400 and components thereof, including the fuel tanks 408 and legs 402, like systems 100 and 300 are of a double-wall construction for fire protection and impact resistance. Moreover, like the system 100 of FIG. 1, support legs 402 are attached directly to the outer tanks 408 via structural mounting brackets 422 or similar mechanisms, while the tanks 408 themselves are directly interconnected to one another by structural members or mounting brackets 424 at a plurality of interconnection points. Again, by utilizing multiple, direct interconnection points between the tanks 408 themselves and the support legs 402, structural rigidity and load support may be increased. In addition, this direct interconnection at multiple points allows the tanks 408 themselves to function as load-bearing, structural members, obviating the need to employ extensive supporting beams or the like.

Figure 5:
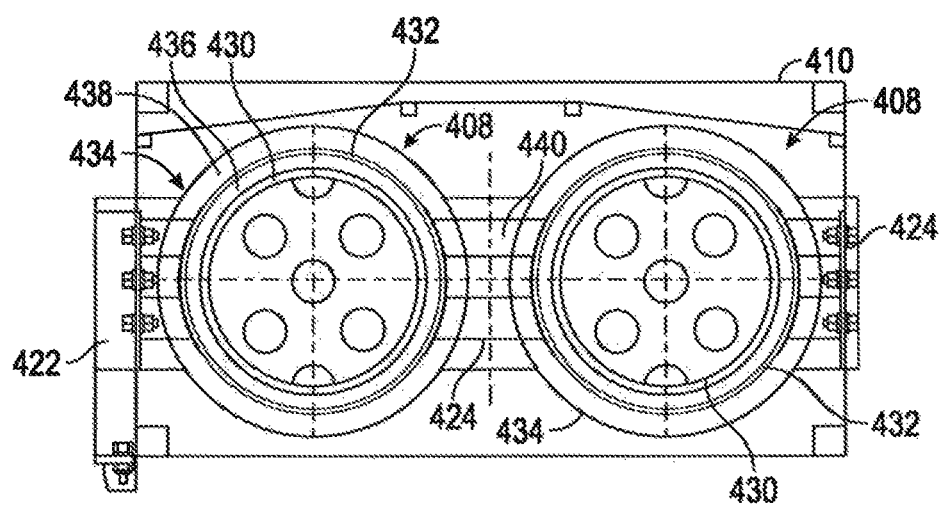
FIG. 5 is a enlarged, cross-sectional view of the fuel storage portion of the fuel storage and distribution system of FIG. 4.

Referring now to FIG. 5, a detailed illustration of the elevated tank arrangement for storage system 400 is shown. As shown therein, each tank 108 is of a triple-wall configuration and has an inner tank 430, an intermediate tank 432, and an outer tank 434. The intermediate tank 432 encompasses the inner tank 430 and is spaced therefrom, defining a first annular space 436 therebetween. Similarly, the outer tank 434 encompasses the intermediate tank 432 and is spaced therefrom, defining a second annular space 438 therebetween. In an embodiment, the inner tank is configured to contain a high pressure gaseous fuel such as CNG or hydrogen. In the preferred embodiment, the first annular space 436 between the inner tank 430 and the intermediate tank 434 is filled with a resin, while the second annular space 438 between the intermediate tank 434 and the outer tank 434 is filled with a thermal insulating material.

In use, the high pressure gas is contained within the inner tank 430 while the resin within the first annular space 436 functions as a shock absorber or structural stresses between the inner tank 430 and the intermediate tank 432. As shown in FIG. 5, the structural support/interconnecting members 422 interconnecting the legs 402 and the tank 408 extend between the legs 408 and the intermediate tank 432, while the interconnecting members 424 extends between the intermediate tank 432 of one tank member 408 to the intermediate tank 432 of an adjacent tank member 408. In this manner, the intermediate tank 432 functions both as a structural member that directly connects adjacent tanks and bears load, and as a reinforcing member. Importantly, this configuration, and specifically the use of an intermediate tank 432 that bears the load of the system 400, prevents structural stresses from being passed to the inner tank 430 that holds the high pressure gaseous fuel.

In addition to the above, the thermal insulating material within the second annular space 438 serves as an insulating layer, providing for both fire resistance and ballistic protection. In an embodiment, the thermal insulating material within the annular space 438 may be Pyrolite (monolithic cement with perlite) or other insulating material. The outer tank 434, for its part serves as a containment vessel for the system 400 and as protection from the elements. Each of the tanks 430, 432, 434 may be formed from steel, although other materials known in the art may also be utilized without departing from the broader aspects of the invention.

Importantly, the triple walled tank 408 eliminates any structural stress on the inner tank 430 which holds the gaseous fuel. As further illustrated in FIG. 5, a thermal insulator 440 such as Pyrolite may also be utilized in or surrounding the connecting members 424, 424 to provide for even greater ballistic and fire protection for the system 400, as a whole.

While the systems described above are shown as stand-alone fuel storage systems, the present invention is not so limited in this regard. In particular, in addition to storing fuel, the systems may be configured to likewise dispense fuel for industrial, commercial and passenger automobile use.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed:

1. An elevated fuel storage unit comprising,
a first fuel tank unit;
a second fuel tank unit;
an interconnecting member connecting said first fuel tank unit and said second fuel tank unit;
wherein said first fuel tank unit and said second fuel tank unit are each comprised of an inner tank, an intermediate tank disposed outside said inner tank, and an outer tank disposed outside said intermediate tank; and
wherein said interconnecting member extends between the intermediate tank of said first fuel tank unit and the intermediate tank of said second fuel tank unit.

2. The elevated fuel storage unit of claim 1, wherein:
a first annular space defined between said inner tank and said intermediate tank is filled with a first material;
a second annular space defined between said intermediate tank and said outer tank is filled with a second material.

3. The elevated fuel storage unit of claim 2, wherein:
said first material is a shock absorbing material.

4. The elevated fuel storage unit of claim 2, wherein:
said second material is a thermal insulating material.

* * * * *